(12) United States Patent
Stern et al.

(10) Patent No.: US 7,475,155 B2
(45) Date of Patent: Jan. 6, 2009

(54) MEDIA PLAYER SYSTEM

(75) Inventors: Denise Stern, Mercer Island, WA (US);
Melissa A Bohm, Seattle, WA (US);
Martina Hiemstra, Newcastle, WA (US); Umachandra Chikkareddy, Redmond, WA (US); James S Hansen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 107 days.

(21) Appl. No.: 11/335,089

(22) Filed: Jan. 18, 2006

(65) Prior Publication Data

US 2006/0136572 A1 Jun. 22, 2006

Related U.S. Application Data

(62) Division of application No. 10/173,291, filed on Jun. 14, 2002.

(51) Int. Cl.
*G06F 15/16* (2006.01)
(52) U.S. Cl. .................. 709/231; 709/203; 709/223; 707/3; 707/4
(58) Field of Classification Search .......... 709/200, 709/203, 217–219, 231, 223; 707/3, 4
See application file for complete search history.

(56) References Cited

U.S. PATENT DOCUMENTS

| 6,248,946 | B1 | 6/2001 | Dwek |
| 6,317,784 | B1 | 11/2001 | Mackintosh et al. |
| 6,687,737 | B2 | 2/2004 | Landsman et al. |
| 6,791,579 | B2 | 9/2004 | Markel |
| 6,834,308 | B1 | 12/2004 | Ikezoye et al. |
| 6,950,623 | B2 | 9/2005 | Brown et al. |

*Primary Examiner*—Saleh Najjar
*Assistant Examiner*—Faruk Hamza
(74) *Attorney, Agent, or Firm*—Christensen O'Connor Johnson Kindness PLLC

(57) ABSTRACT

A method, system, and computer readable medium are provided for the media player system. The present invention provides for associating content with media and integrating the content associated with media into a pane displayed by a media player. The media player system includes a shuttle component to obtain provider data, a first database component to store content and associated media metadata, a user interface to manage the first database user interface, an input component to insert provider data into the first database, and an output component to generate pane and search files. The media player system includes a user interface to display a pane for the media with associated content. The pane includes a media display component to display streamed media and a content display component to display content associated with the streamed media.

9 Claims, 20 Drawing Sheets

454 — CONTENT
461 — PROPERTY ID
462 — CONTENT START DATE
463 — CONTENT END DATE
464 — LANGUAGE
465 — OVERRIDE
466 — TEXT LINKS
467 — CONTENT DATA
468 — STYLE SHEET ID
469 — SEARCH INFORMATION
470 — TITLE
471 — SHORT DESCRIPTION
472 — DESCRIPTION
473 — URL
474 — ALTERNATE TEXT
475 — TEXT LINKS
476 — IMAGE
477 — KEYWORDS
478 — VALUE
479 — RELEVANCY
480 — DEFINITIVE

*Fig.4C.*

```
510 ┐
    ├─ SITE 1
520 ─┼── SITE ID
521 ─┼── UPDATE STATUS
522 ─┼── SITE DATA
523 ─┼────── CREATE DATE
524 ─┼────── LAST MODIFIED DATE
525 ─┼────── START DATE
526 ─┼────── END DATE
527 ─┼────── LANGUAGE
528 ─┼────── TITLE
529 ─┼────── DESCRIPTION
530 ─┼────── URL
531 ─┼────── SORT KEY
532 ─┼────── ALTERNATE TITLE
533 ─┼────── TITLE PATH
534 ─┼────── ID PATH
535 ─┼────── KEYWORDS
536 ─┼────── SITE TYPE
537 ─┼────── MEDIA
538 ─┼────── SEARCH INFORMATION
539 ─┼────────── TITLE
540 ─┼────────── SHORT DESCRIPTION
541 ─┼────────── URL
542 ─┼────────── ALTERNATE TEXT
543 ─┼────────── ICON
544 ─┼────────── PICTURE
545 ─┼────────── PROVIDER LOGOS
546 ─┼────────── TEXT LINKS
547 ─┴────────── ACTION ITEMS
```

*Fig. 5B.*

MEDIA PLAYER SYSTEM

CROSS-REFERENCE TO RELATED APPLICATION

This application is a divisional of U.S. patent application Ser. No. 10/173,291, filed Jun. 14, 2002, priority from the filing date of which is hereby claimed under 35 U.S.C. § 120.

FIELD OF THE INVENTION

The present invention generally relates to the field of software. More specifically, the present invention relates to publishing media and content across a network.

BACKGROUND

The Internet is enjoying widespread popularity today, in big part due to the ability to view, listen, and interact with rich-media, including online movies, music, and games. Today's media players, such as the Windows Media Player marketed by Microsoft Corporation of Redmond, Wash., and the RealOne Player marketed by RealNetworks Incorporated, of Seattle, Wash., are easy to use and enable users to enjoy the full range of digital media activities, including playback of CD audio, streaming, and downloaded audio and video.

Although rich media files can be accessed by downloading through a low-speed Internet connection, the viewing and/or listening experience is much improved by streaming and fast Internet connections. Streaming media involves encoding or digitizing the media files and sending them to servers as a series of small data packets that may be viewed by the user in a real-time fashion through the use of a media player, like the Microsoft® Windows Media Player. The rich media and high-speed Internet connections now available make interactive ads, games, and entertainment a highly sought after commodity. Rich media with advanced multimedia characteristics also provide for effective interactive advertising.

As the demand and audience for high-speed rich media grow, the ability to smartly and efficiently target advertising content to viewers of high-speed rich media is becoming increasingly significant. Because of privacy and security issues of concern among users, advertising based on user profiles is not desirable. In light of the above, a significant need exists for a media player system that enables online rich media advertising and marketing campaigns targeting an audience based on the content of the media being accessed. An efficient streamlined system is needed to associate and manage content and media provider relationships across the network.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention addresses the above needs by providing a media player system. Generally described, the media player system provides for associating content with media and providing a pane that displays media and the content associated with the media.

In accordance with a first aspect of the present invention, a computer system for associating content with media and integrating the content associated with media into a media player is provided. The computer system includes a server input component, a first server database component, and a server output component. The server input component is operable to obtain content associated with media and insert the content associated with media into the first server database. The first server database is operable to store content associated with media metadata. The server output component is operable to obtain the content associated with media from the first server database and generate content files used to create a pane to display content with associated media.

In accordance with another aspect of the present invention, a computer-implemented method for associating content with media and integrating the content associated with media into a media player is provided. The computer obtains data, including content associated with media, and stores data on a drop server. Upon storing the data, the computer inserts the data, including content associated with media, into a first server database. The computer generates content files from the data including content associated with media data in the first server database. The content files are used for creating a pane for displaying content associated with media.

In accordance with yet another aspect of the present invention, a method for providing a user interface for displaying streamed media and content associated with the streamed media in a computer system having a media player embedded in a browser is provided. The computer receives a user request to display streamed media with associated content. The computer obtains the requested streamed media. The computer obtains the content associated with the streamed media. The computer uses the media player embedded in the browser to display the requested media with the associated content.

In accordance with an additional aspect of the present invention, a computer system for displaying streamed media and content associated with the streamed media is provided. The computer system includes a server media player component operable to be downloaded and embedded in a client component to display streamed media and content associated with the streamed media. The computer system includes a server database operable to store content associated with said streamed media. The computer system includes a server output component operable to generate content files used by the media player to display the content associated with the streamed media. The computer system includes a server electronic document component operable to receive a request from said client component for said streamed media and associated content. In response to receiving the request, the server application causes the media player to be downloaded and embedded in the client component to display the streamed media and said associated content.

In accordance with a further aspect of the present invention, a computer-readable medium having a data structure stored thereon for use in associating content with media and integrating the content associated with media into a media player is provided. The data structure includes a control data element indicative of job control information and one or more item data elements that are indicative of information about an item of content associated with media provided. The data structure also includes one or more media elements that are indicative of media metadata and associated with said item of content. The data structure is used in inserting data including content associated with media into a database. The data structure is also used in generating content files for use by a media player to display said media with said associated content.

In accordance with a further aspect of the present invention, a computer-readable medium having a data structure stored thereon for use in associating content with media and integrating the content associated with media into a search database used in searching for content associated with media is provided. The data structure includes a control data element indicative of job control information and one or more site data elements that are indicative of information about a site for accessing content associated with media provided in the search files. The data structure includes one or more media elements that are indicative of information about the media and associated content for the site. The data structure is used to generate search files from a database storing content associated with media. The search files are based on the data structure and are sent to a search database used in searching for said content associated with media.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-4D are block diagrams showing illustrative data structures utilized by an exemplary embodiment of the media player system;

FIGS. 5A-5B are block diagrams showing illustrative data structures utilized by an exemplary embodiment of the media player system;

DETAILED DESCRIPTION

Figure 1:
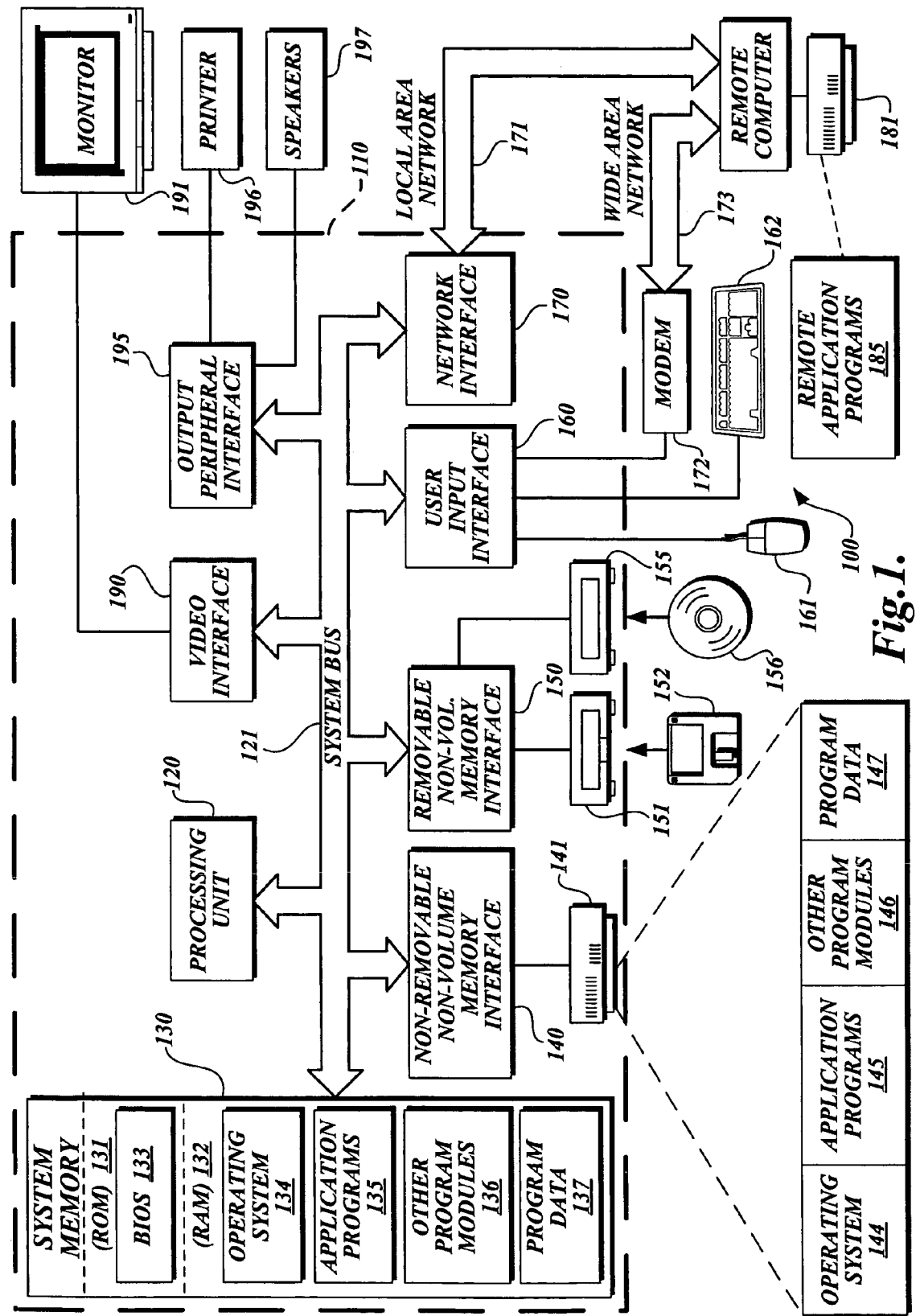
FIG. 1 is a block diagram showing an illustrative operating environment for an actual embodiment of the present invention.

As briefly described above, the present invention provides methods, systems, and computer-readable media for targeting ads and content based on the media being streamed to the user. Referring now to the figures, a representative operating environment for an actual embodiment of the present invention is illustrated by FIG. 1. The illustrated computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purposes or special computing environments or configurations. Examples of well known computing systems, environments, and/or configurations that may be suitable for implementing the invention include, but are not limited to, personal computers, server computers, laptop devices, multiprocessor systems, microprocessor-based systems, network PCs, mini-computers, mainframe computers, distributed computing environments that include any of the above systems, or the like.

Referring now to FIG. 1, an illustrative computer system for the media player system is described. The many components of a personal computer system that a client and server computer may consist of are illustrated in FIG. 1 as computer 110 and may include, but are not limited to, a processing unit 120, a system memory 130, and a system bus 121 that couples various system components, including the system memory, to the processing unit 120. The system bus 121 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus. Computer 110 typically includes a variety of computer-readable media. Computer-readable media can be any available media that can be accessed by computer 110 and include both volatile and nonvolatile media and removable and nonremovable media. By way of example, and not limitation, computer-readable media may comprise computer storage media and communication media. Computer storage media include both volatile and nonvolatile and removable and nonremovable media implemented in any method or technology for storage and information, such as computer-readable instructions, data structures, program modules, or other data. Computer storage media include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium that can be used to store the desired information and that can be assessed by computer 110. Communication media typically embody computer-readable instructions, data structures, program modules, or other data in the modulated data signal, such as a carrier wave or other transport mechanism, and include any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory, such as read-only memory (ROM) 131 and random-access memory (RAM) 132. A basic input/output system 133 (BIOS) contains basic routines that help to transfer information between elements within computer 110, such as program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as CD-ROM or other optical media. Other removable/nonremovable, volatile/nonvolatile computer storage media that can be used in the exemplary operating environment include, but are not limited to, magnetic tape cassettes, flash memory cards, digital versatile disk, digital videotape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information to the computer through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user-input interface 160 that is coupled to the system bus, but may be connected by other interface and bus structures, such as a parallel port, game port, or universal serial bus (USB). A monitor 191 or other type of display device is also connected to the system bus 121 via an interface, such as a video interface 190. In addition to the monitor, computers may also include other peripheral output devices, such as speakers 197 and printer 196, which may be connected through an output peripheral interface 195.

As discussed earlier, one embodiment of the present invention operates in a networked environment using logical connections to one or more remote computers, such as a remote computer. The remote computer may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory storage device 181. It will be appreciated that the network connections shown are exemplary, and other means of establishing a communication link between the computers may be used.

Figure 2:
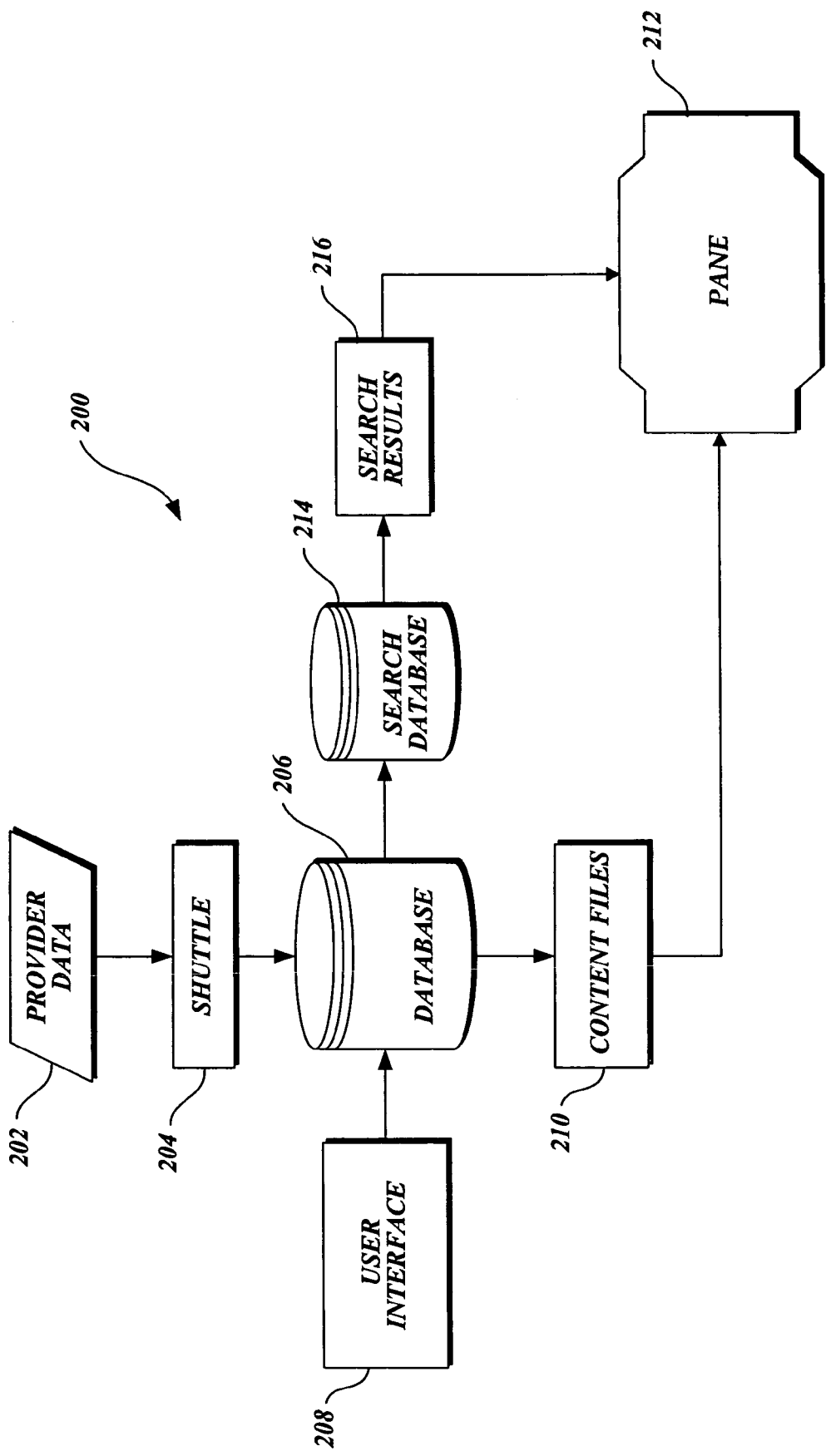
FIG. 2 is a block diagram showing an illustrative architecture for the media player system.

Having described an exemplary computing environment in which the present invention may be practiced, attention is directed to FIG. 2, which schematically depicts components of an illustrative embodiment of the media player system. The media player system is preferably used with a high-speed Internet connection, which makes accessing video and interactive media more enjoyable. While the media player system performance will be best with a high-speed Internet connection, the media player system is not limited for use by users with a high-speed Internet connection. The media player system of the present invention fully supports users with a low-speed Internet connection, such as a slower dial-up connection. As those of ordinary skill in the art will readily appreciate, the present invention may be practiced utilizing any speed or type of Internet connection. The term high-speed is used to refer to a high-speed connection to the Internet, such as a cable modem, a Digital Subscriber Line (DSL) or LAN connection. The DSL is a digital communications technology that can provide high-speed transmissions over standard copper telephone wiring. The local area network may be a broadband network on which transmissions travel as radio frequency signals over separate inbound and outbound channels. Stations on a broadband network are connected by coaxial or fiber-optic cable, which can carry data, voice, and video simultaneously over multiple transmission channels that are distinguished by frequency. A broadband network is capable of high-speed operation (20 megabits or more). Although the present invention performs optimally with a high-speed Internet connection, such as the exemplary high-speed Internet connections described above, the advantages and benefits of the media player system of present invention are fully realized utilizing any speed or type of Internet connection.

In accordance with one embodiment of the present invention, the media player system 200 includes provider data 202. In one embodiment, the provider data is external feeds. For example, the provider data feeds can be batch extensible markup language ("XML") feeds from content providers for content items. The media player system also includes a shuttle component for picking up the provider data and dropping off the provider data. The media player system includes a database 206 for storing items used to generate the pane content. The database stores information about each piece of content and the associated media metadata. The database 206 includes information to be supplied to the search database 214 for searching for content and for generating each piece of content on the pane 212. The media player system also includes the user interface 208 for use as a tool to allow content editors to create, modify, and publish individual pieces of content associated with media. The information stored in the database 206 is used to generate content files 210 for displaying the pane 212. The database 206 is also used to generate the search files for sending to the search database 214. The search database 214 is used for searching for content associated with media. The user searches for content using the search database 214, which generates search results 216. The search results 216 provide one or more links to a pane that include content associated with media. When the user clicks on a content link included in the search results 216, the pane 212 is displayed.

FIG. 2 illustrates only one example of a suitable architecture for the media player system and is not intended to suggest any limitation as to the scope of use or functionality of the present invention. Those skilled in the art will appreciate that the present invention may be practiced utilizing various other media player system architectures, which vary from that illustrated in FIG. 2.

Figure 3A:
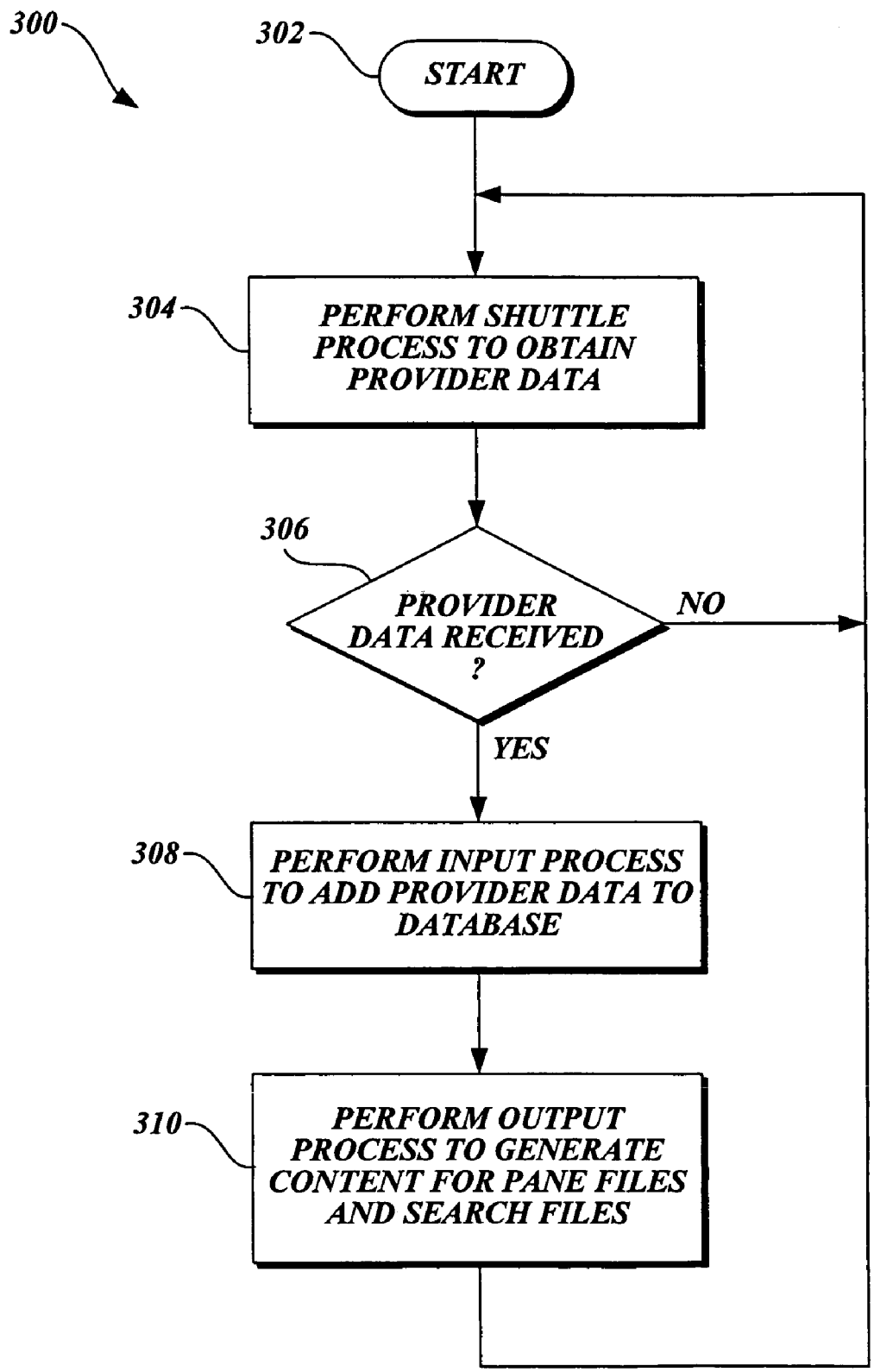
FIGS. 3A-3D are flow diagrams illustrating the logic utilized by an exemplary embodiment of the media player system.

FIG. 3A illustrates a routine 300 for performing the method used by the media player system for associating content with media and for providing a pane for displaying the content and the associated media. The routine 300 begins at block 302 and proceeds to block 304 where a shuttle process is performed to obtain provider data 202. The routine 300 proceeds to decision block 306 where a test is made to determine whether any provider data has been received. If it is determined that provider data has been received, routine 300 proceeds to block 308 where an input process is performed to add the provider data to the database 206. After performing the input process, routine 300 proceeds to block 310. At block 310, routine 300 performs an output process to generate pane and search files. After performing the output process, routine 300 proceeds to cycle back to block 304 where the above steps are repeated. If at decision block 306 it was determined that provider data had not been received, routine 300 cycles back to block 304 and the above steps are repeated.

Figure 3B:
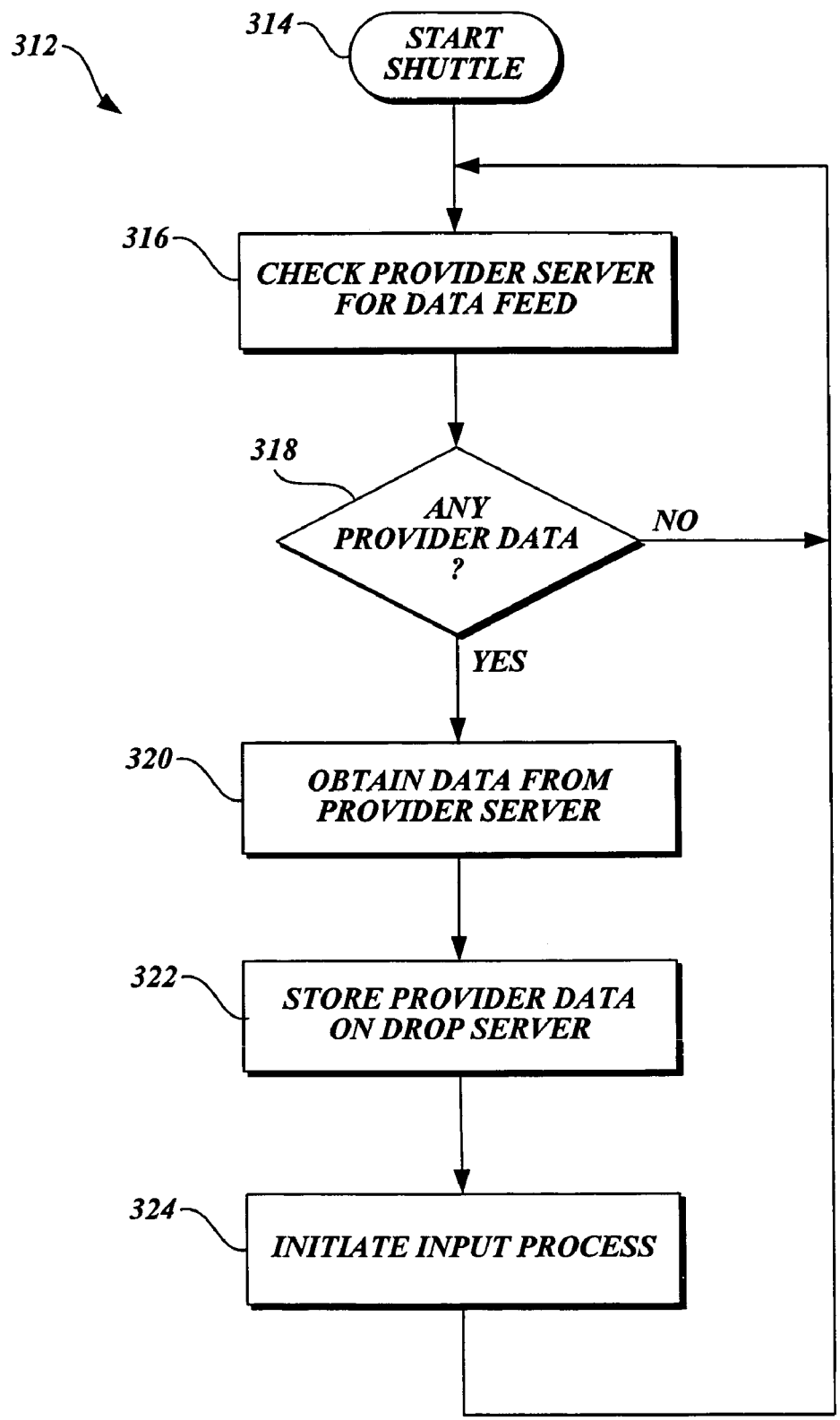

FIG. 3B illustrates the shuttle process 312. The shuttle process 312 starts at block 314 and proceeds to block 316, where the provider server is checked for provider data. The shuttle process proceeds to decision block 318 where a test is made to determine if any provider data is available on the provider server. If it is determined that there is provider data at decision block 318, the shuttle process proceeds to block 320. If it is determined that no provider data is available at decision block 318, the shuttle process 312 cycles back to block 316 to check for provider data again. At block 320, the shuttle process 312 obtains the provider data from the provider server. The shuttle process proceeds to block 322 to store the provider data on a drop server. After storing the provider data on the drop server, the shuttle process 312 proceeds to block 324 and initiates the input process shown in FIG. 3C. After triggering the input process, the shuttle process 312 cycles back to block 316 and the above steps are repeated.

Figure 3C:
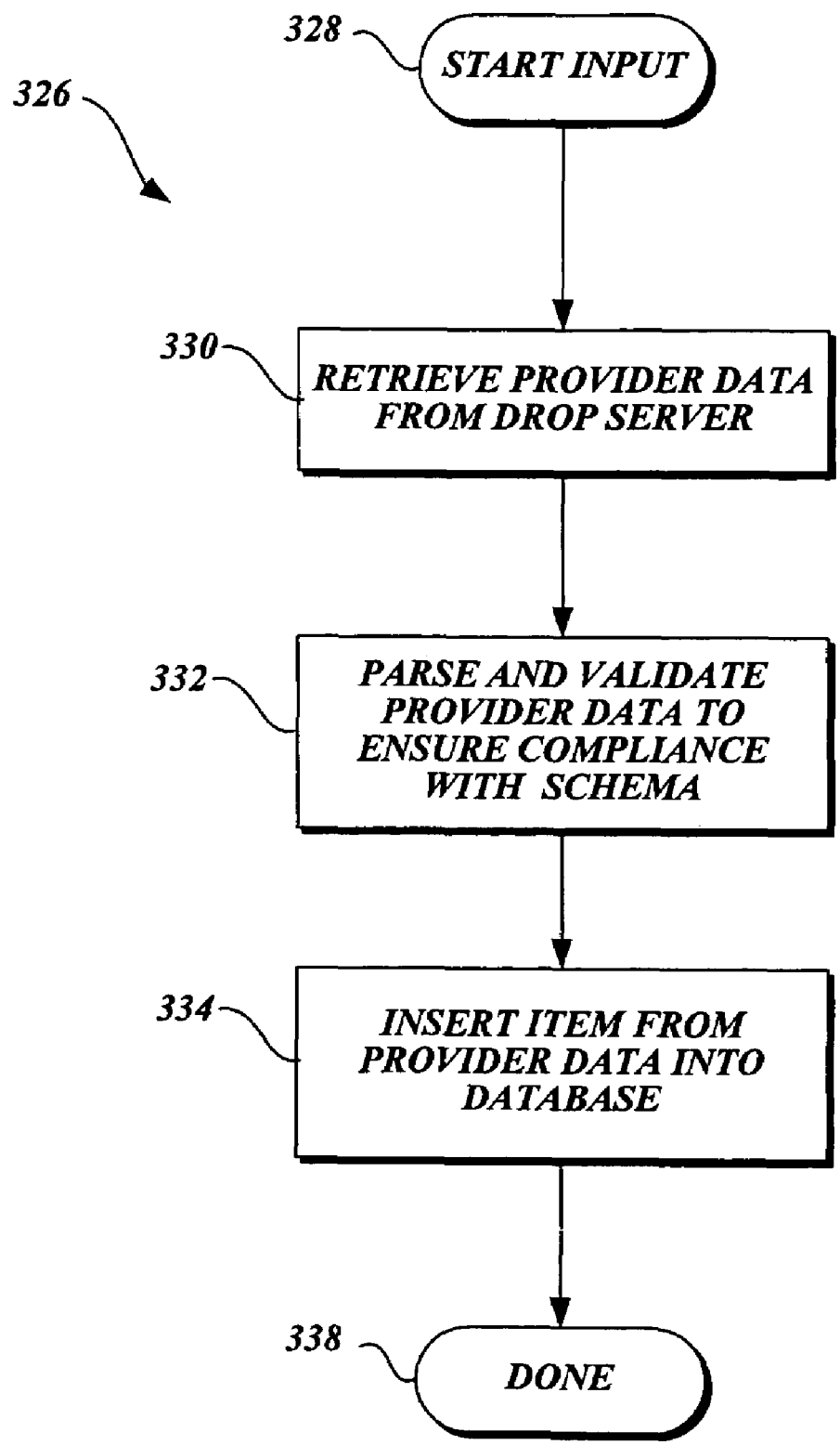
Figure 4A:
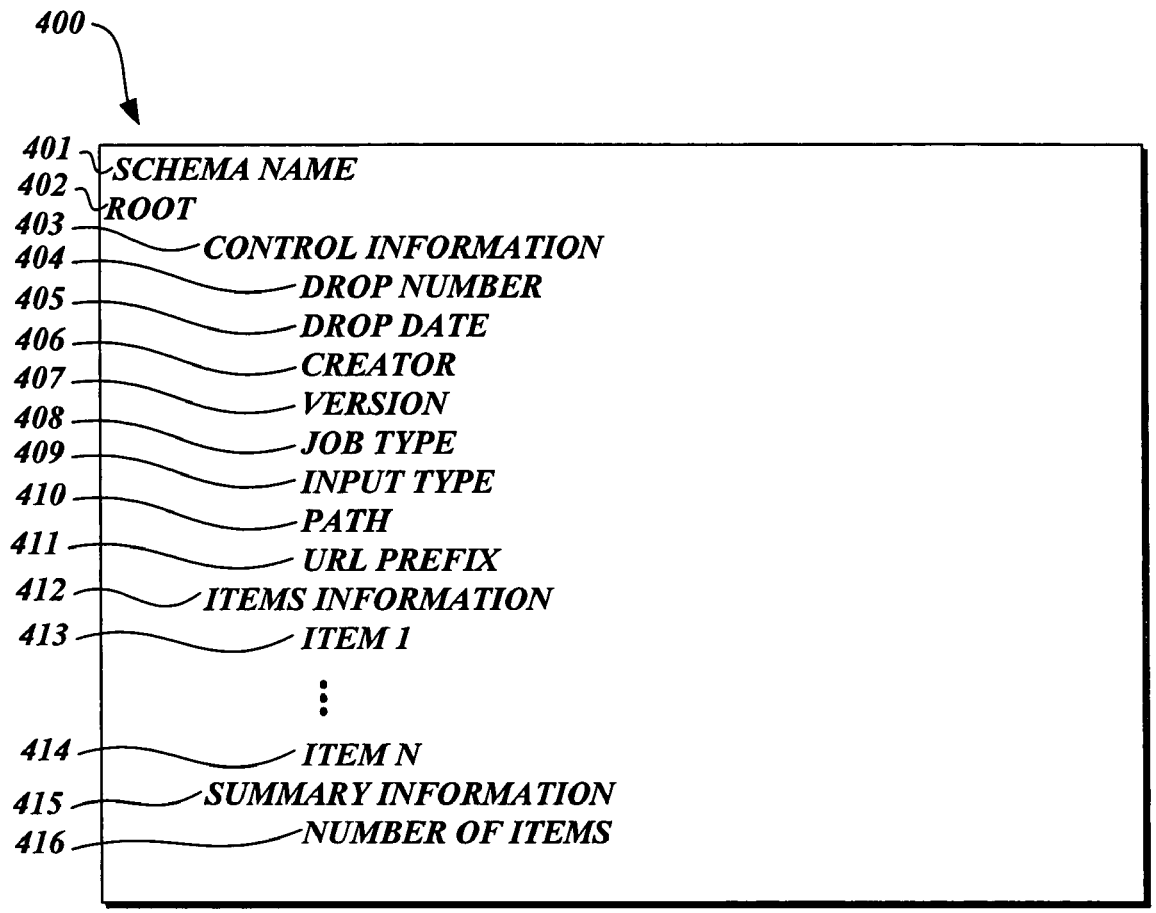

FIG. 3C illustrates the input process 326. The input process 326 begins at block 328 and proceeds to block 330, where the provider data 202 is retrieved from the drop server. After retrieving the provider data, the input process 326 proceeds to block 332. At block 332, the input process 326 parses and validates the provider data to ensure compliance with an input schema, such as the exemplary input schema 400 shown in FIGS. 4A-4C and discussed below. After parsing and validating the provider data, the input process 326 proceeds to block 334. At block 334, the input process inserts item information from the provider data 202 into the database 206. After inserting the item information into the database, the input process 326 is completed.

Figure 3D:
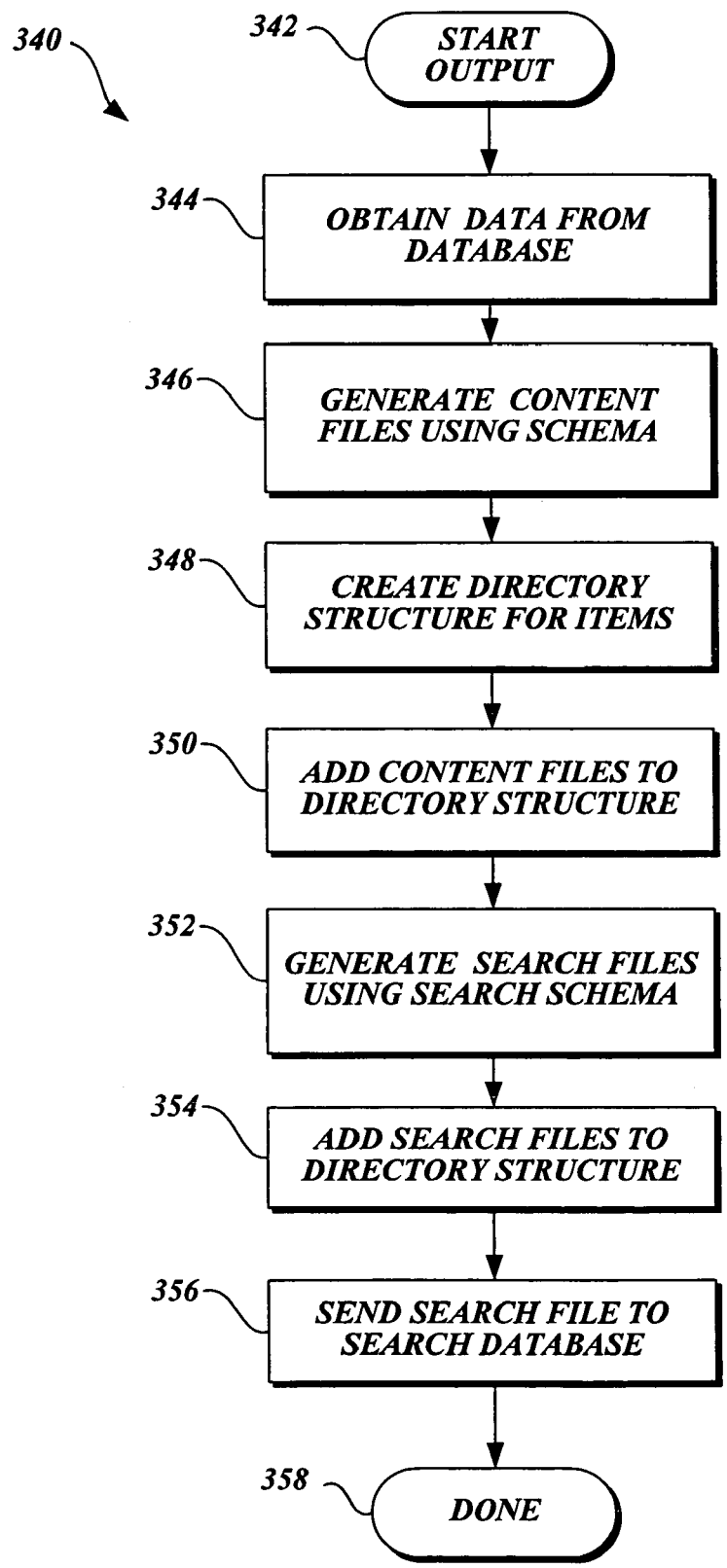

FIG. 3D illustrates the output process 340. The output process 340 begins at block 342 and proceeds to block 344 where data is obtained from the database 206. After obtaining the data from the database, output process 340 proceeds to block 346. At block 346, the output process generates content files using a schema, such as the exemplary schema 400 shown in FIGS. 4A-4C and discussed below. After generating content files for displaying the pane, the output process 340 proceeds to block 348. At block 348, the output process creates a directory structure for the items. In one embodiment of the present invention, the output process creates a directory structure that corresponds to the structure illustrated by the schema shown in FIGS. 4A-4C and discussed below. After creating the directory structure for the items, the output process proceeds to block 350 where the output process adds the content files to the directory structure.

After adding the content files to the directory structure, output process 340 proceeds to block 352. At block 352, output process 340 generates search files for the content and associated media. In an exemplary embodiment of the present invention, the output process creates the search files using a search schema such as that shown in FIGS. 5A-5B and discussed below. After generating the search files, the output process proceeds to block 354. At block 354, the output process adds the search files to the directory structure. After adding the search files to the directory structure, the output process 340 proceeds to block 356. At block 356, the output process sends the search files to a search database. After the search information is sent to the database, the output process 340 proceeds to block 358, and the output process is completed.

FIGS. 4A-4D and 5A-5B illustrate schemas utilized by the media player system in accordance with an exemplary embodiment of the present invention. The schemas shown in FIGS. 4A-4D and 5A-5B illustrate the data structure used by an exemplary embodiment of the present invention. In one embodiment of the present invention, an XML schema is used to implement the data structures shown in FIGS. 4A-4D and 5A-5B. An XML schema is a specification that provides a common base for data description and validation in XML environments. The XML schema replaces Document Type Definition (DTD) by defining a greater set of data types with more explicit data descriptions. The XML schema has become a standard for the description and encoding of data and is well known by those of ordinary skill in the art. In the illustrated embodiment, the media player system 200 utilizes the input schema 400 shown in FIGS. 4A-4D. The schema 400 is a hierarchically organized set of information with an uppermost level root 402 and three top level elements. The first top-level element is for control information 403 and includes job control information. The second top-level element is for items information 412 and includes information for each content item 413 being imported from the provider data 202. The third top-level element is for summary information 415 and includes summary information.

In an exemplary embodiment of the present invention, the Control Information 403 includes a drop number 404, drop date 405, creator 406, version of schema 407, job type 408, input type 409, path 410, and Uniform Resource Locator (URL) prefix 411. The drop number 404 is an incremental number indicating the sequence of provider drops for an item. The drop date 405 is the date when the provider data is available. For example, in one embodiment the drop date is the date when the provider batch XML data is stored on a drop server and made available to the media player system. The creator 406 specifies the name of the provider supplying the data. In one embodiment of the present invention, the creator name is assigned by the media player system 200. The version 407 specifies the version number of the schema format with which the provider data is compatible. The job type 408 indicates whether the drop is full or incremental. In one embodiment of the present invention, when the input type is incremental, the job-type element includes information indicating a previous drop date and a previous drop number. The input type 409 differentiates batch input from user interface input. In one embodiment of the present invention, the default input type is batch input from the provider stored on the drop server. A user interface input type indicates that an override has been specified via the user interface. The override will cause the content specified by the user to be used in place of the provider content. In one embodiment, the path 410 is a standard File Transfer Protocol ("FTP") path that provides the path for accessing media files that are to be downloaded.

The summary information 415 includes summary and statistics information, such as the number of items 416 when the current drop is processed. In another exemplary embodiment, the summary information 415 also includes validation information.

Figure 4B:
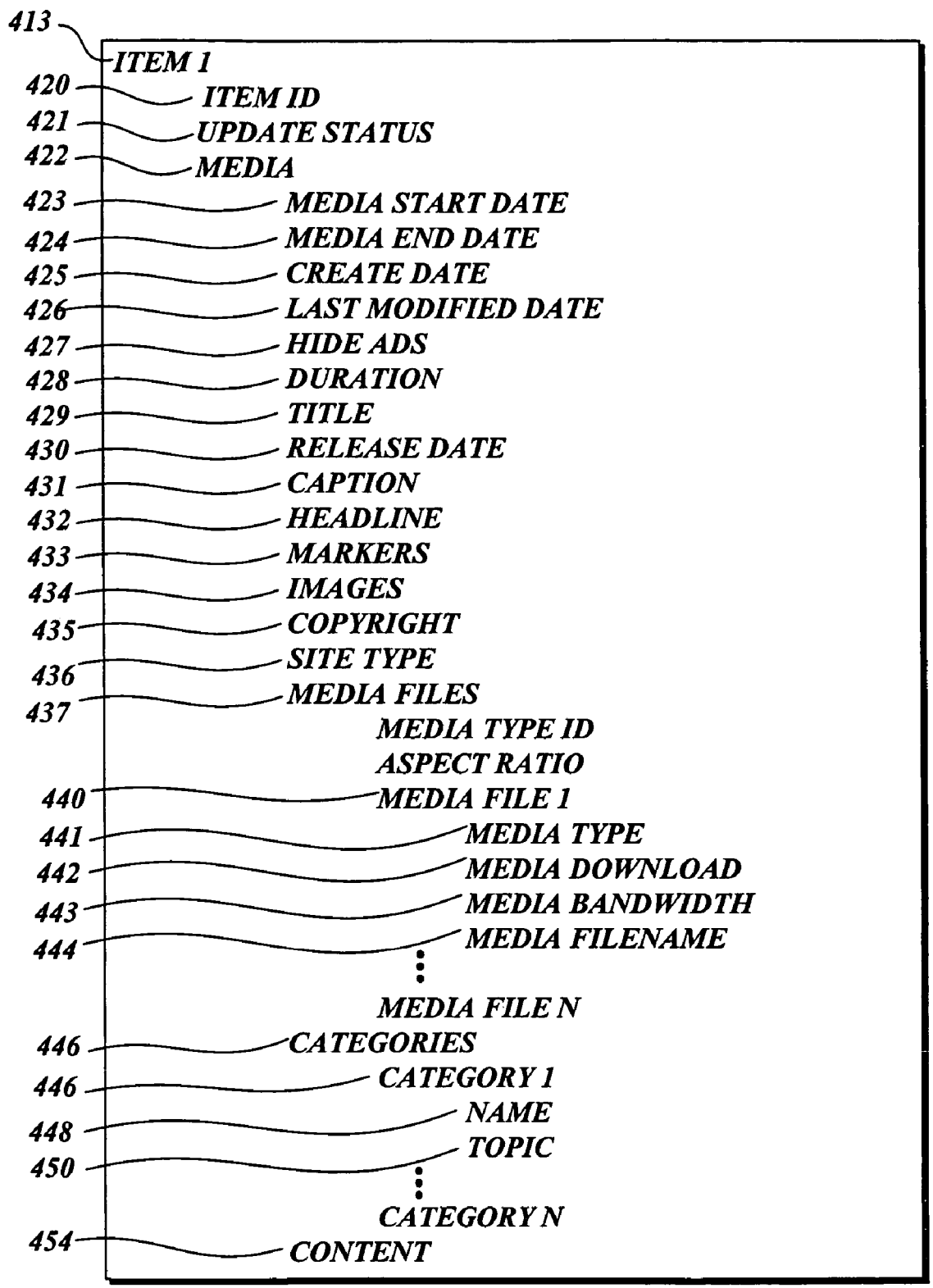

FIG. 4B illustrates an exemplary data structure for an item 413 for information about an item of content that is associated with media and is being obtained from the provider data 202. In one embodiment, each item 413 includes an item ID 420, an update status 421, and associated media 422. The item ID 420 is a value that is used to identify the item. The item ID 420 is the same value for all drops for the same item, and the item ID 420 is unique across all items in the drop. The update status 421 for incremental drops and the default is unchanged. In one embodiment, the media 422 includes a media start date 423, a media end date 424, create date media 425, last modified date 426, a hide ads 427, duration 428, title 429, release date 430, caption 431, headline 432, markers 433, images 434, copyright 435, site type 436, media files 437, categories 446, and content 454. The media start date 423 and the media end date 424 indicate when the media for the item is available for including in search results 216. The create date 425 is the date the item was created in the database 206. The last modified date 426 is the date the item information was last modified in the database 206. The hide ads 427 indicates that ads should not be displayed with the media 422. The duration 428 indicates the time needed to play the media 422. The title 429 is the title of the media 422. The release date 430 is the date the media 422 was released in the market. In one embodiment, a hide release date element is also included in the schema to indicate whether the release date should be displayed. The caption 431 is a caption for the media 422. The headline 432 is the media headline. The markers 433 provide markers and/or trigger information such as start, end, and target information. The images 434 provide information about the images specific to the media 422. The copyright 435 includes copyright information for the media 422. The site type 436 includes information about the type of site for the media 422 For example, in one embodiment the site type 436 may be empty or may have information indicating a particular type of site such as a featured site, a Web directory site, a Web page site, and a site that includes a personal authentication service, such as the passport services from Microsoft Corporation of Redmond, Wash.

The media files 437 element includes information about the associated media files. In an exemplary embodiment of the present invention, the media files hold information for each of a plurality of media files. For example, the media file 440 information includes media type 441, media download 442, media bandwidth 443, and media filename 444 elements. The media type 441 indicates the type of the media file. For example, the media file type may be an Advanced Streaming Format for a streaming multimedia file containing text, graphics, sound, video, and animation. Alternatively, the media file type may be a sound file stored in waveform (WAV) audio format. The media download 442 element indicates whether media is to be played directly or is to be downloaded and played. The media bandwidth 443 indicates the streaming rate of the media. The media filename 444 may be a full path, or just the file name, if File Transfer Protocol is being used. The categories 446 include information about the categories name 448 of topics 450 that are associated with the media 422.

FIG. 4C illustrates exemplary content 454 element for information about the date sensitive content to be displayed on the pane 212. FIG. 4C illustrates content information utilized in accordance with one embodiment of the present invention. In the illustrated example shown in FIG. 4C, the content includes information about property ID 461, a content start date 462, a content end date 463, a language 464, an override 465, text links 466, content data 467, and search information 469. The content start date of content 462 indicates when the content is available for display on the pane 212. Likewise, the content end date 463 indicates the last date the content date is available for display on the pane 212. The language 464 indicates the language of the content. The override 465 indicates whether the user interface 208 was utilized to specify content that is to override the batch input content from the provider. The text links 466 are the links for display at the end of the description on the pane 212. The content data 467 is for information identifying the content data file. In the illustrated embodiment, the content data file is an XML file, and the content file information includes an identifier of an XML style sheet 468. The XML style sheet contains formatting rules that are applied to an XML content data file referencing the style sheet. XML style sheets are well known by those of ordinary skill in the art.

In one embodiment of the present invention, the search information includes a title 470, a short description 471, a long description 472, a uniform resource locator ("URL") 473, alternate text 474, text links 475, image 476, and a collection of keywords 477. The title 470 is the title for the media 422. The short description 471 is the short description for the media 422, such as a movie. The URL 473 is the URL address to the resource on the Internet where media 422 resides. If a URL prefix is defined, the URL prefix will be prepended to all URLs in the drop. The alternate text 474 is the tool tip text that is to be displayed on the links or images mouse over. The keywords 477 are a collection of keywords for the content. In one embodiment, the collection of keywords includes the value 478 for each keyword, a measurement of the relevancy 479 of the keyword, such as a number between 0 and 1, with 1 being the most relevant, and a definitive 480 indicator.

Figure 4D:
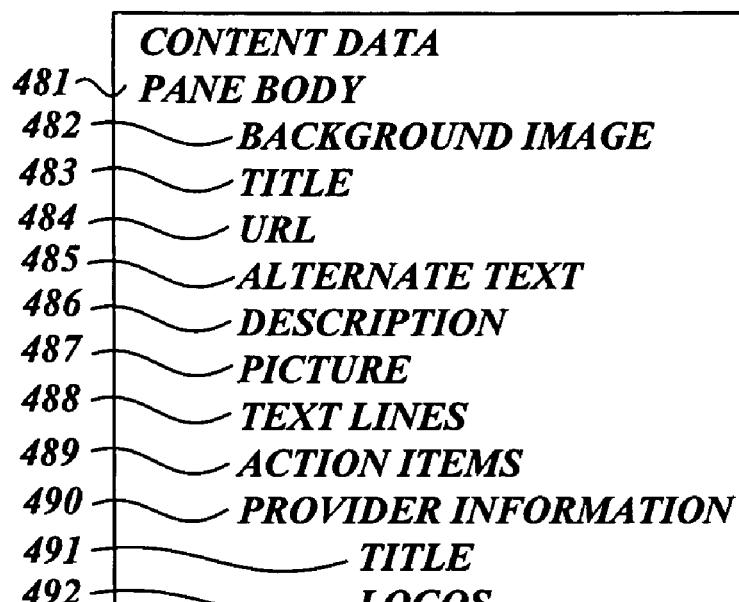

In a preferred embodiment of the present invention, the same schema 400 is utilized by the media player system 200 to generate the content files as was utilized for importing provider data. In a preferred embodiment, the schema 400 includes the content data 467 element that provides data used for generating the content files that in turn are used for displaying the pane 212. An exemplary data structure for the content date 467 is illustrated in FIG. 4D. Content includes a pane body 481 element for information about the pane to be displayed with the associated media 422.

The pane body 481 includes a background image 482, title 483, a URL 484, alternate text 485, description 486, picture 487, text links 488, action items 489, and provider information 490. The title 483 is the title to be displayed on the body of the pane 212. The URL 484 is the URL if a link is required for the title. The alternate text 485 is the tool tip text that is to be displayed on links or images mouse over. The picture 487 is information about the media picture image. The text links 488 are the links for display at the end of a description on the pane 212. The action items 489 provide information about the links displayed in the pane. In one embodiment of the present invention, the action items information may include a text link information, such as a teaser or title, an absolute link for the teaser, and alternate text for the link. The provider information 490 provides information about the provider logos 492 and title 491 for display in the pane. The provider information 490 may include a title 491 and a logo 492. The provider logo may include a link for a logo image, an absolute link for a logo click, and tool tip text for the logo. In another exemplary embodiment of the present invention, the provider information may also include hot text links to be displayed on a pane.

Figure 5A:
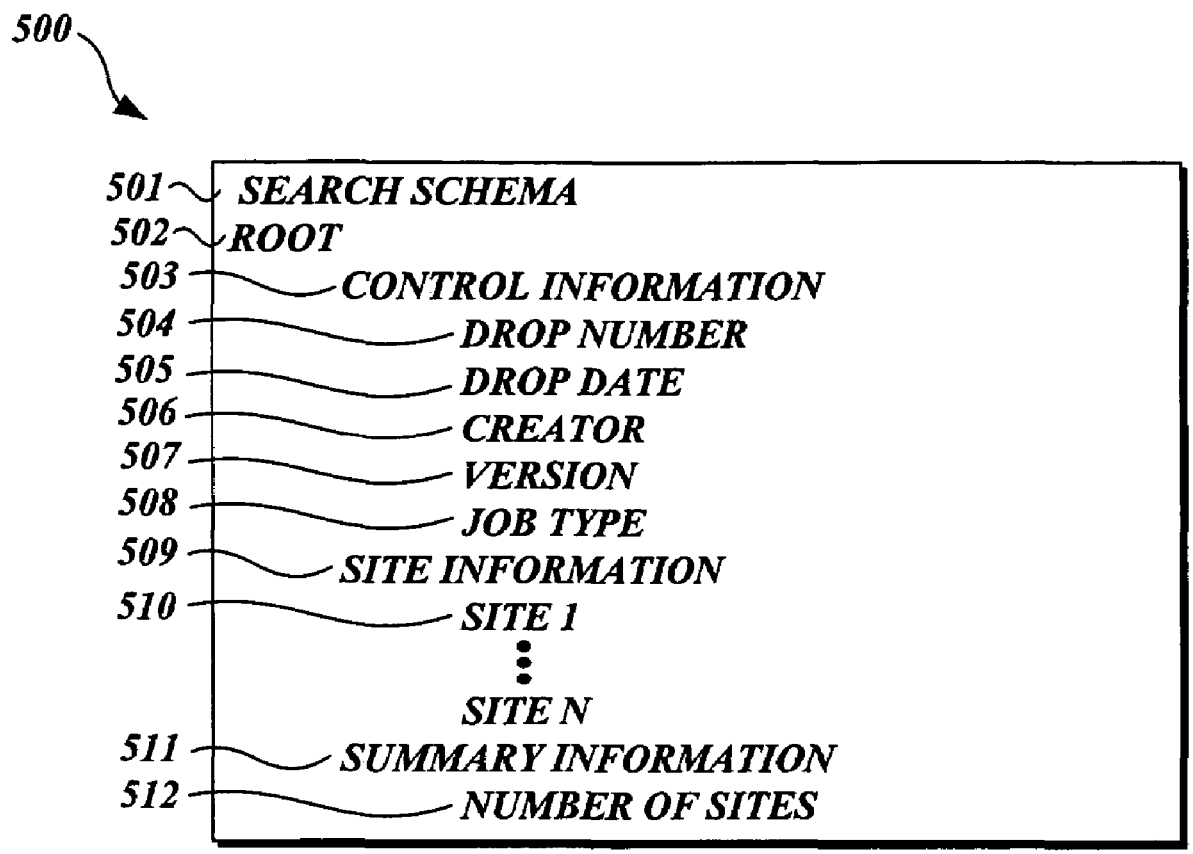

FIGS. 5A-5B illustrate a search schema 500 utilized by the media player system 200 in accordance with one exemplary embodiment of the present invention. In the illustrated embodiment, the media player system 200 uses the search schema 500 for generating search files to be sent to and stored on a server search database 214. FIG. 5A illustrates an exemplary search schema 501, which includes a root 502 element that includes a top-level control information 503 element for job control information, a top-level site information 509 element for sites information, and a top-level summary information 511 element for summary information, such as the number of sites 512.

In the illustrated embodiment, the search schema control information 503 element is similar to the control information in the schema 500 and includes the drop number 504, drop date 505, creator 506, version 507, and job type 508. FIG. 5B illustrates an exemplary site 510, which includes an ID 520, and update status 521, and site data 522. The ID 520 is the identification value for the site. In one embodiment, the ID for the site value should be the same between drops and should be unique across sites in the drop. The update status 521 is utilized for incremental job types. The site data 522 is the data for the site if this is the first instance of the site. The site data 522 includes the create date 523, last modified date 524, start date 525, end date 526, language 527, title 528, description 529, URL 530, sort key 531, alternate title 532, title path 533, ID path 534, keywords 535, site type 536, and media 537. The create date 523 is the date the data was created in the database 206, the last modified date 524 is the date the data was last modified in the database 206. The start date 525 and end date 526 are the dates the site is available. The title 528 is the title to be displayed at the site and the description 529 is the description to be displayed in the site. The URL 530 is the URL to the site. The alternate title 532 is the tool tip text to be displayed on links or images mouse over. The title path 533 is the lineage as category names. The ID path 534 is the lineage as category IDs. The keywords 535 are the collection of keywords for the site.

The media 537 indicates that the site has media content. The search information 538 indicates that the site is about a media type. The search information includes title 539, short description 540, URL 541, alternate text 542, icon 543, picture 544, provider logos 545, text links 546, and action items 547. The media includes search information 538 similar to the search information 469 in the schema 400. The title 539 indicates the title or teaser for the search results. The short description 540 is the description that comes below the teaser. The URL 541 is the URL that appends to the URL prefix. The icon 543 is the icon information. The picture 544 is the information about the media image. The provider logos 545 provide information about the provider logos. The text links 546 are the links that go with the text on search results. The action items 547 are the information about the links that will be displayed on the pane 212.

The schemas illustrated in FIGS. 4A-4D and 5A-5B illustrate only one example of suitable schemas for the media player system 200 and are not intended to suggest any limitation as to the scope of user functionality of the present invention. Those skilled in the art will readily understand that the present invention may be practiced using various other input schemas, output schemas, and search schemas that vary from those illustrated herein. For example, other embodiments of the present invention use various combinations of the data structures and elements described above. Still other embodiments of the present invention utilize data structures and data elements in addition to those defined by the illustrative schemas described herein. One embodiment of the present invention utilizes the illustrated schemas, which define similar data structures for input processing, output processing, and search processing for efficiency of operation of the media player system 200. The similar input, output, and search schemas streamline the data processing efficiency and provide a unified approach to associating content with media and displaying the content with associated media in a pane.

Figure 6:
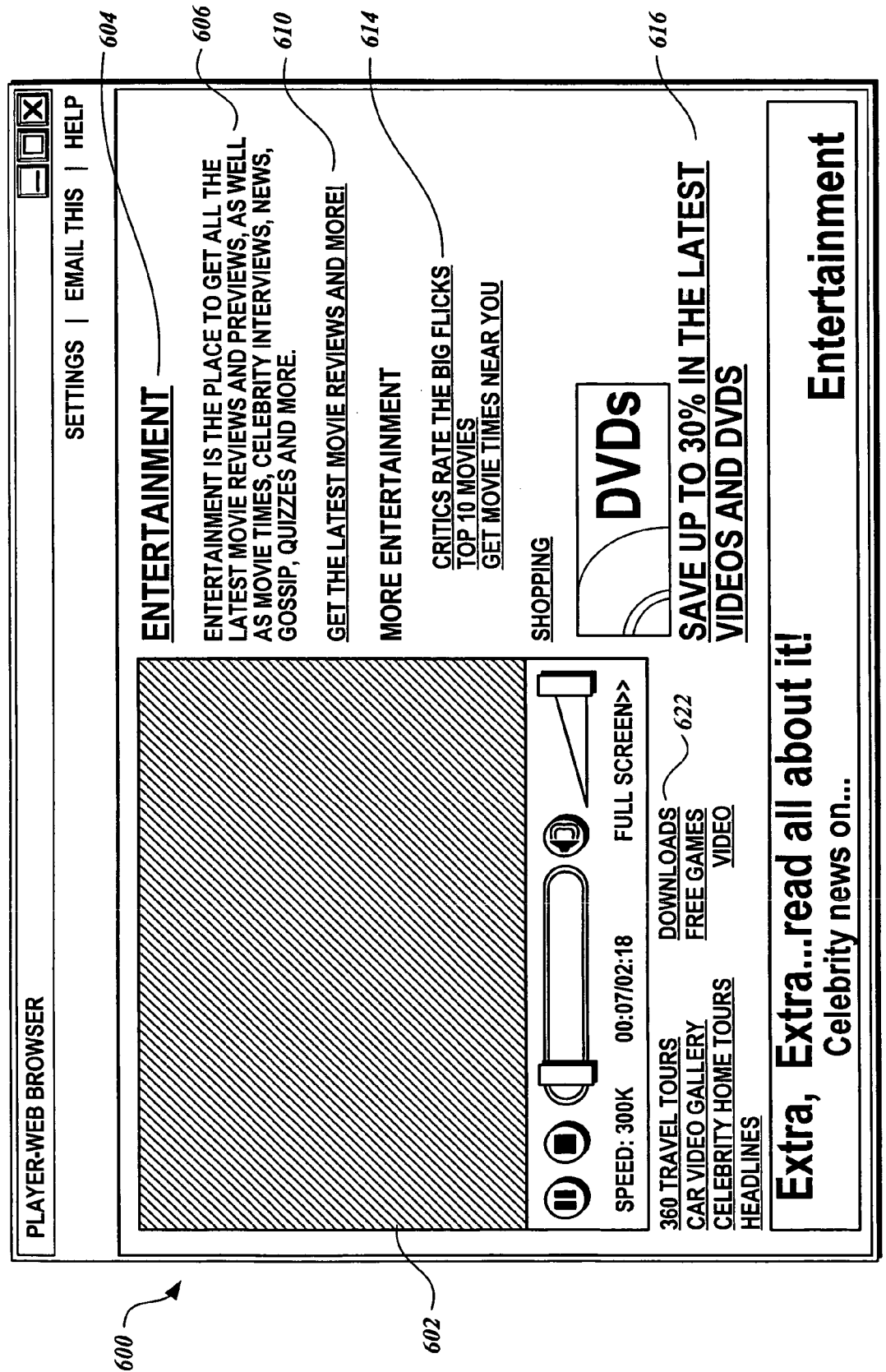
FIG. 6 is a screen diagram showing an illustrative pane screen displayed by an exemplary embodiment of the media player system.

FIG. 6 is a screen display 600 illustrating the representative window generated by the media player system 200 of the present invention. The screen display 600 includes video content area 602 in which the media player displays video. The screen display 600 includes a link to the property or topic home site 604. The screen display 600 also includes content teaser text 606. In another embodiment, the screen display may include a content related image. The screen display 600 includes a link to expanded content page 610. The screen display 600 includes action item links to related content 614. The screen display 600 also includes links to provider sites 616 and 622.

Figure 7:
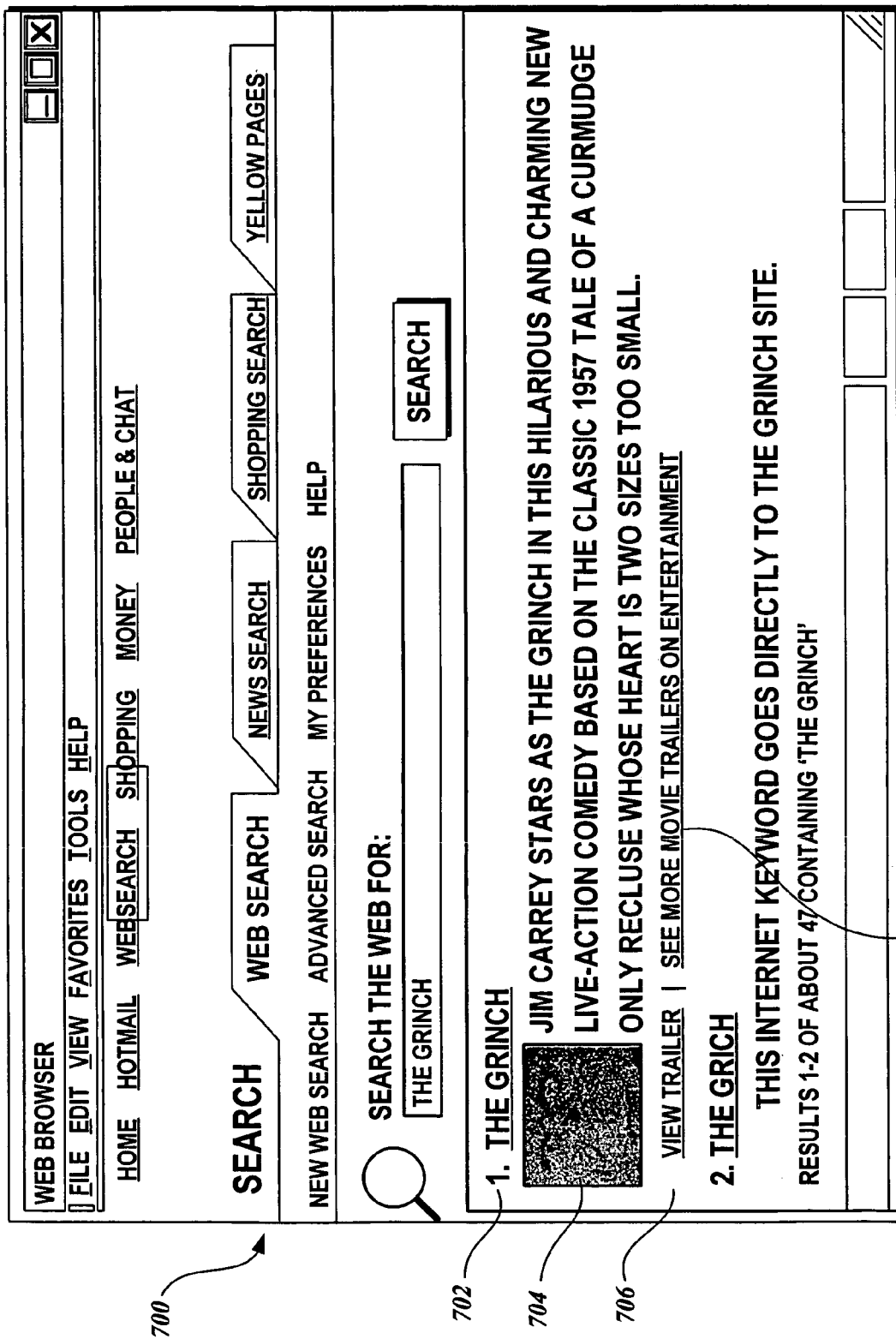
FIG. 7 is a screen diagram showing an illustrative screen display of search results from a search database.

FIG. 7 is a screen display 700 illustrating the representative search results window provided by the media player system 200 of the present invention. The screen display 700 shown in FIG. 7 illustrates a search results Web page that includes content associated with media. In the illustrated search results shown in FIG. 7, the content displayed is associated with media for the Grinch movie. The search results include a title of the media that is a link 702 to the pane 212. The search results include an image 704 related to the media, which the user can click through to navigate to the pane 212. The search results also include a related trailer content link 706 to the pane 212. Additionally, the search results provide a link 708 to the entertainment property Web site associated with the media and content.

Figure 8A:
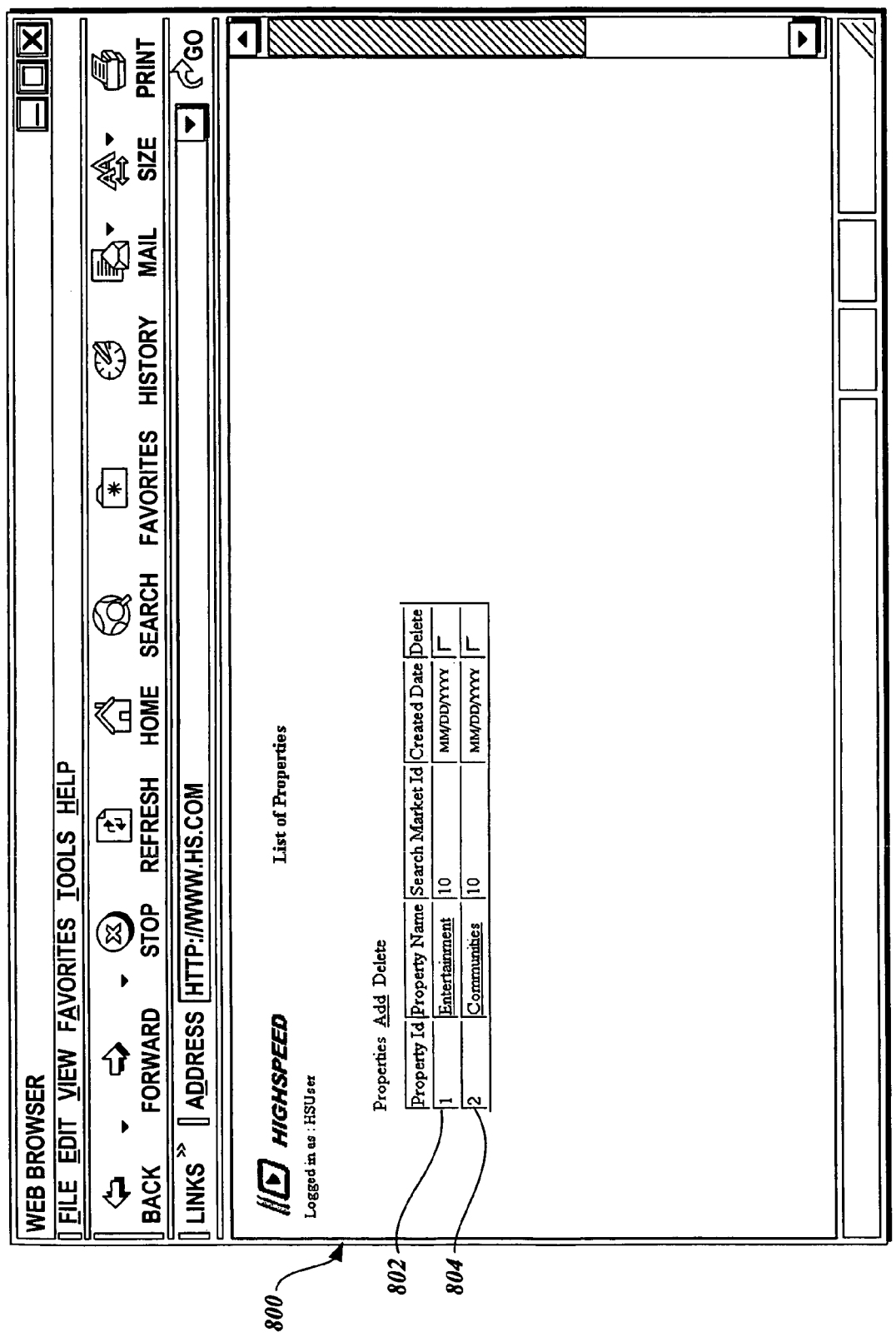
FIGS. 8A-8F are screen diagrams showing illustrative screen displays provided by an exemplary embodiment of the user interface application for the database.
Figure 8B:
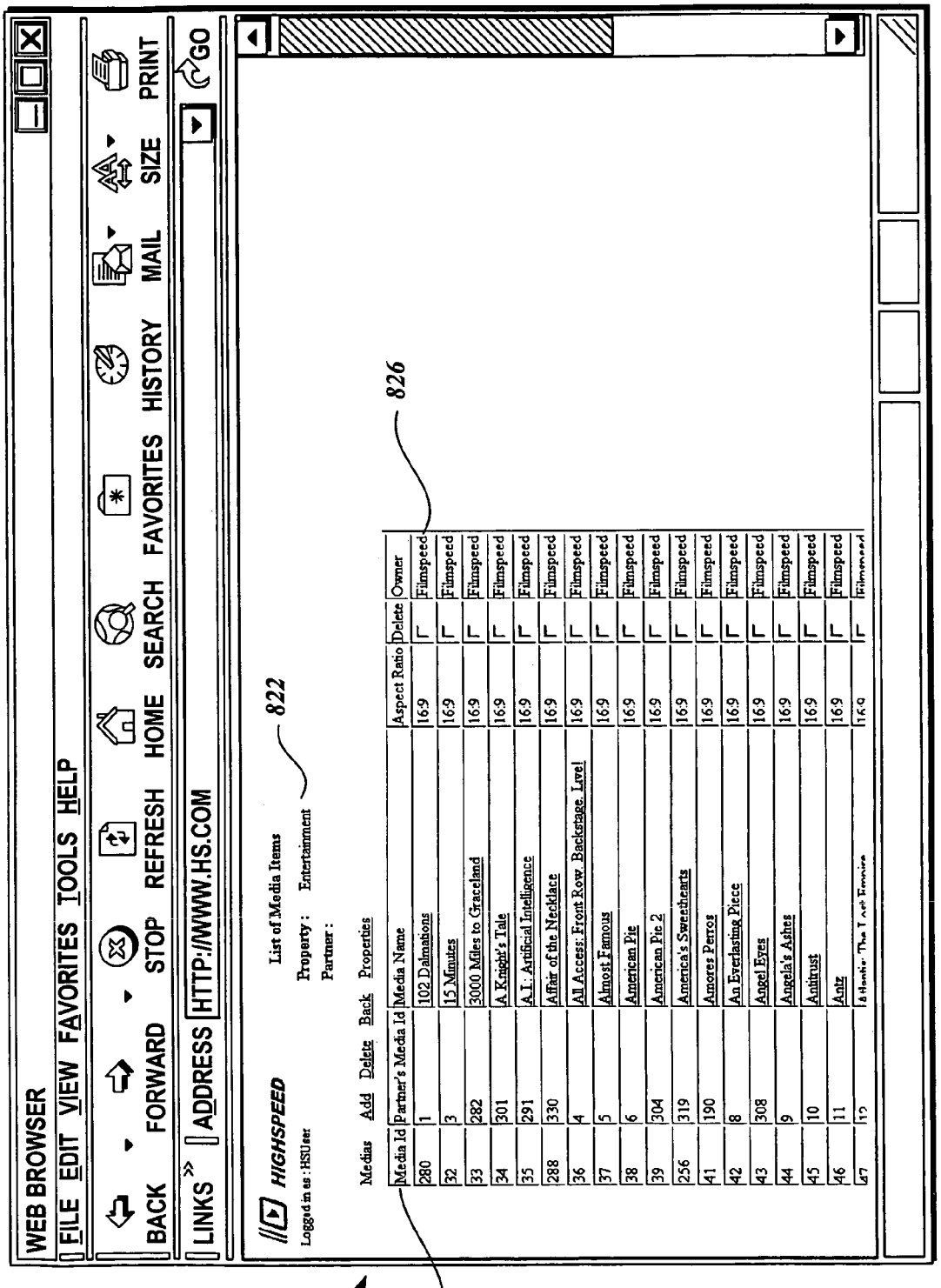
Figure 8C:
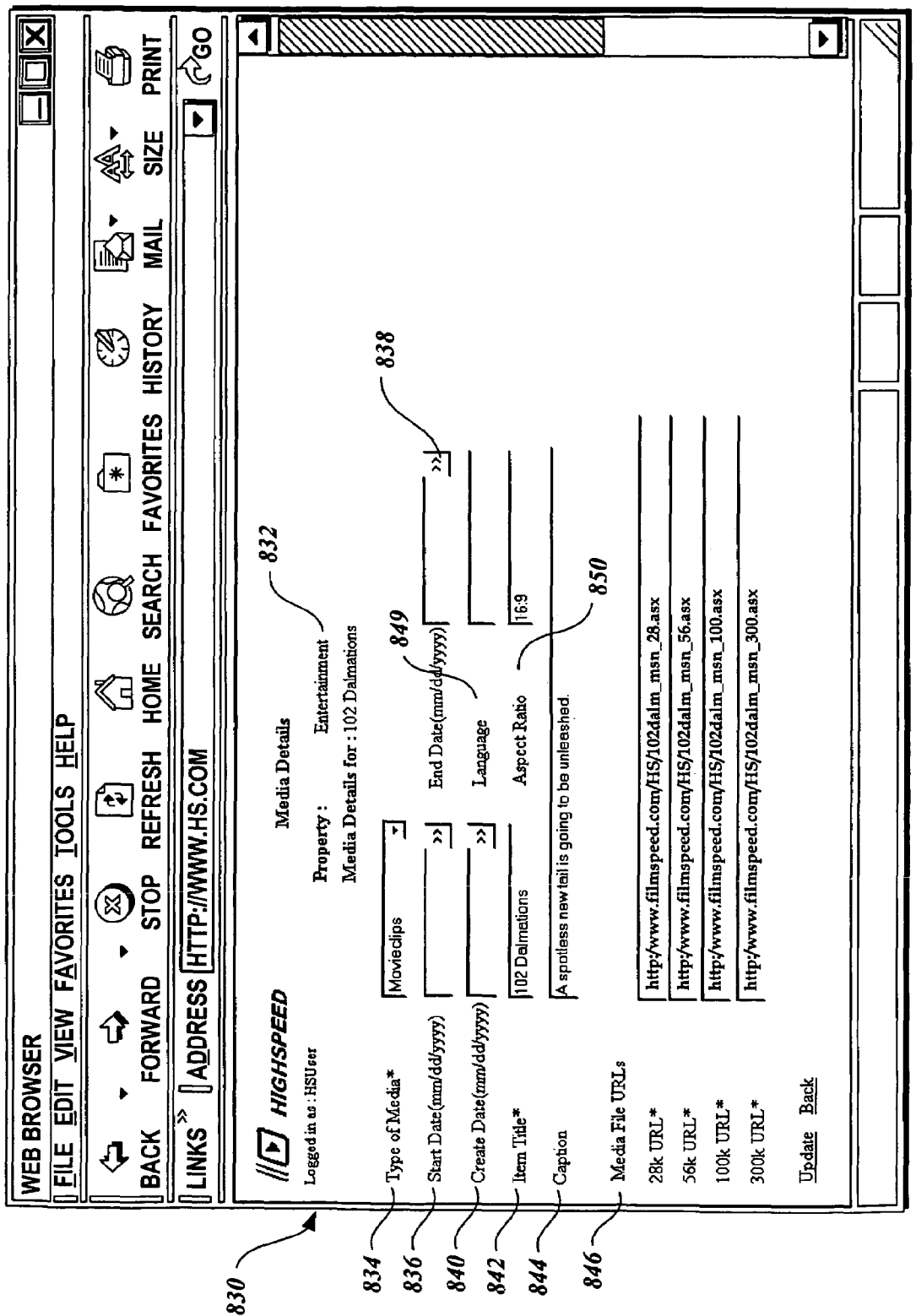

FIGS. 8A-8F illustrate representative screen displays generated by the user interface component 208 for maintaining the database 206 of the present invention. The screen display 800 shown in FIG. 8A illustrates a list of properties. The list of properties includes entertainment property 802 and communities property 804. The screen display also includes a created date for indicating when the property was created. The screen display 820 shown on FIG. 8B illustrates a list of media generated by the user interface 208. For example, screen display 820 lists media 824 for the movie 102 *Dalmatians*. The media items listed in screen display 820 are associated with the entertainment property 822. The media item 824 for 102 *Dalmatians* is provided by Filmspeed 826. The screen display 830 shown on FIG. 8C illustrates a representative list of media details for the entertainment property 832 provided by the user interface 208. The screen display 830 displays the media type 834, which is the movie clips media type. The screen display 830 also includes a field for the start date 836 and the end date 838 for when the media is available. The screen display 830 also includes the create date field 840 to indicate when the media item was added to the database. The media details also include item title field 842, which is 102 *Dalmatians*. The caption 844 provides a caption "a spotless new tail is going to be unleashed." Screen display 830 includes the media file URLs for the different speeds of the media files. Screen display 830 also includes the language field 849 and an aspect ratio field 850.

Figure 8D:
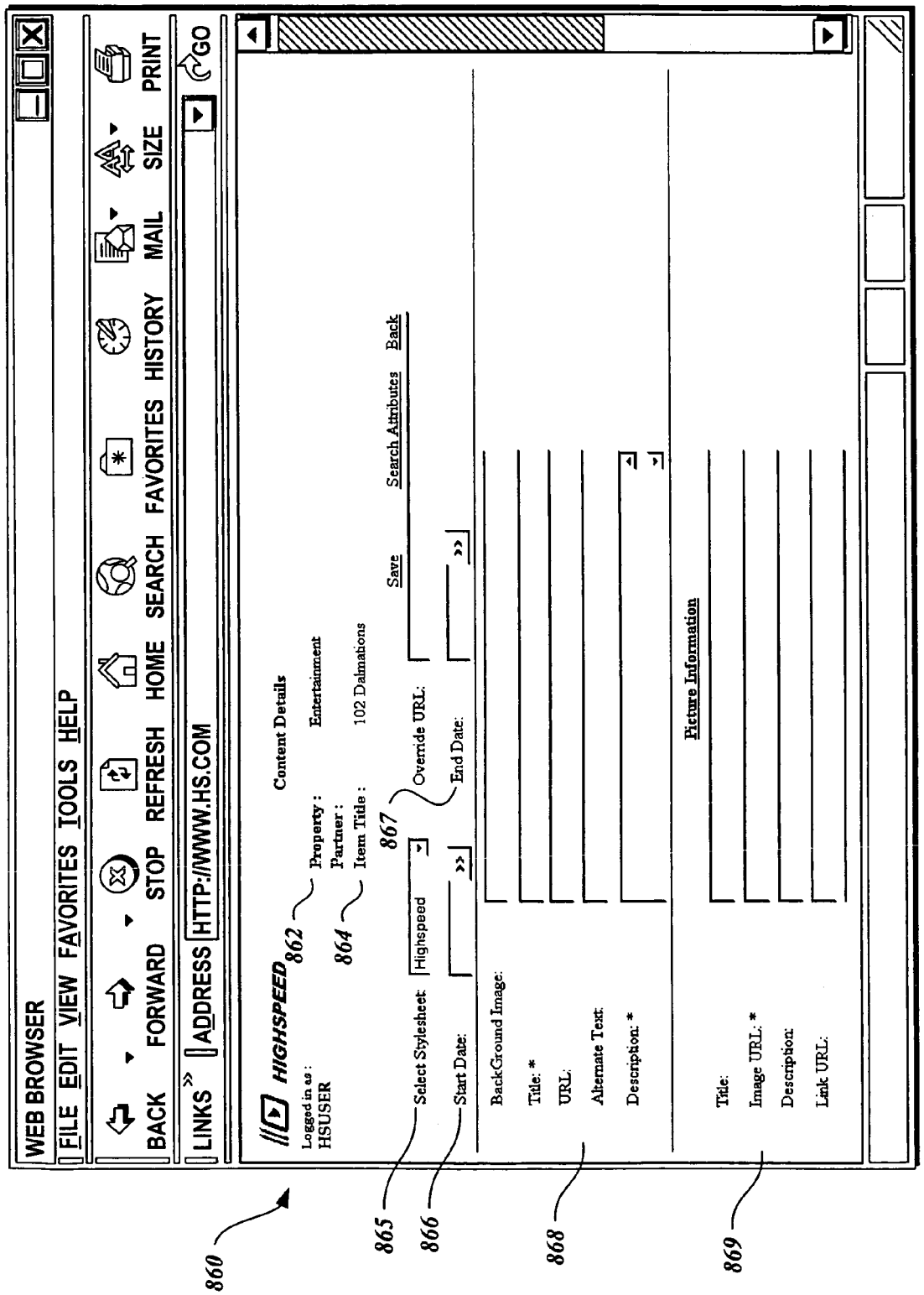

FIG. 8D illustrates representative screen displays generated by an exemplary embodiment of the user interface application 208 of the present invention. The screen display 860 includes a display of the content details for the entertainment property 862. The content details are for the item title 864 for the media 102 *Dalmatians*. The screen display 860 also includes the start date 866 and the end date 867 for the content availability. The screen display 860 includes the content information for display 868, including the background image, title, URL, alternate text, and description. The screen display 860 also includes the picture information 869 for information about the media image.

Figure 8E:
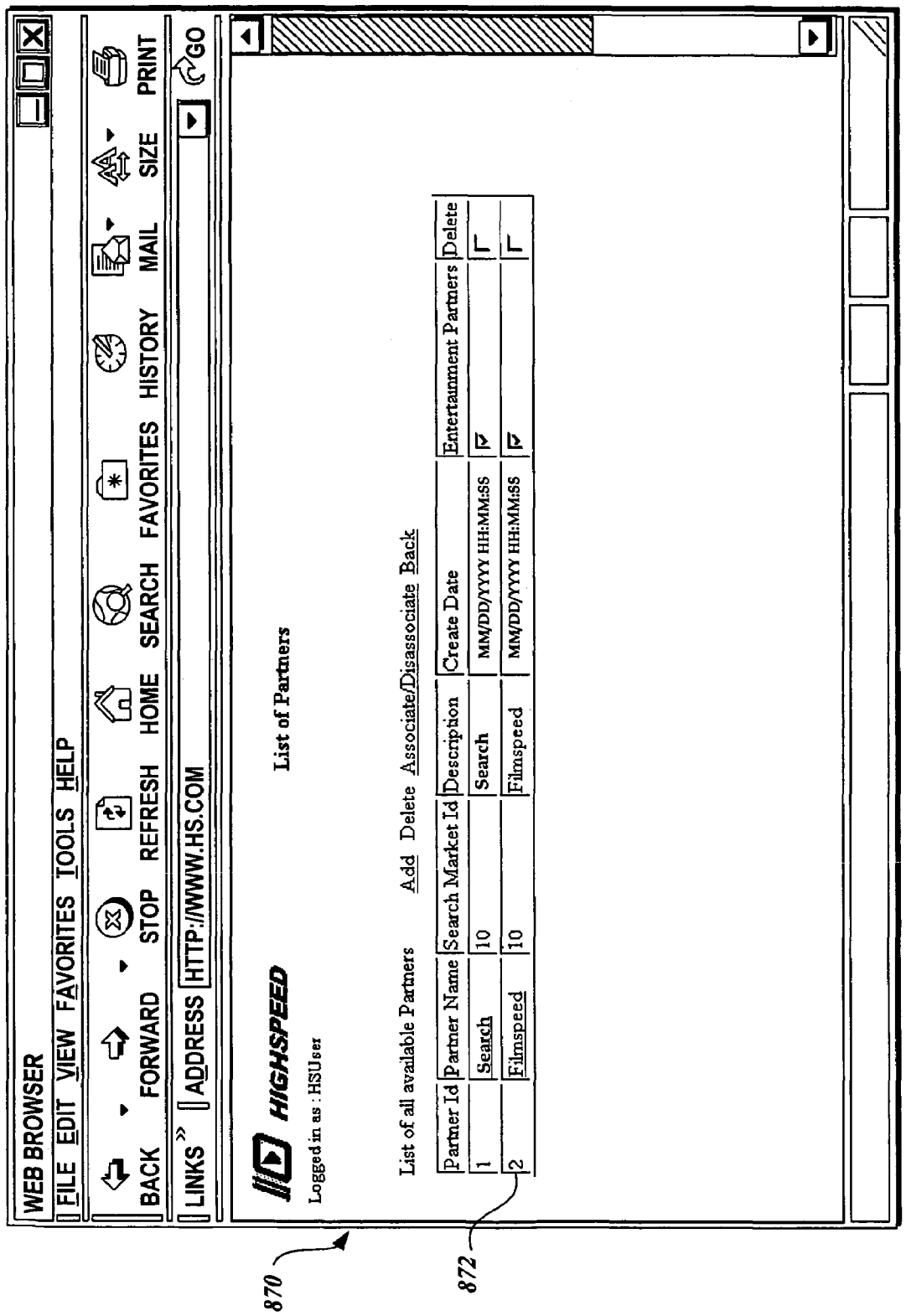

FIG. 8E illustrates a representative screen display 870 generated by an exemplary embodiment of the user interface application 208 of the present invention. The screen display 870 includes a list of the providers of the media and content. The screen display 870 indicates that the provider of the media and content is Filmspeed 872.

Figure 8F:
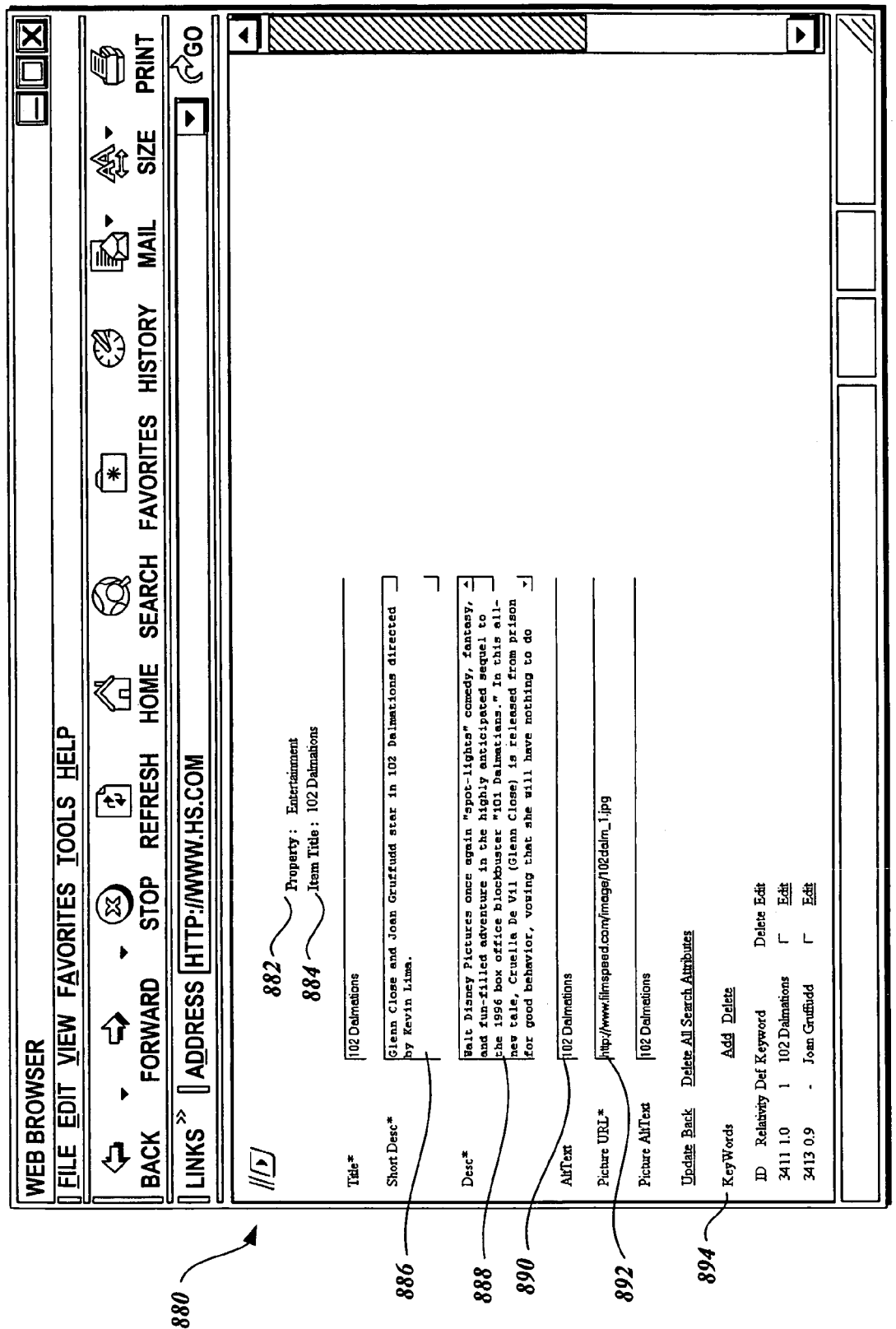

FIG. 8F illustrates a representative screen display 880 generated by an exemplary embodiment of the user interface application 208 of the present invention. The screen display 880 includes a list of the search attributes. Screen display 880 illustrates the search information for the entertainment property 882 and the item title 884 for 102 *Dalmatians*. The screen display 880 includes a short description 886, the long description 888, the alternate text 890, the picture URL 892 as well as the key words 894.

With reference once again to FIG. 2, in an alternative embodiment of the present invention, the components of the media player system may be implemented as distributed software components accessible via the communication network 116. An example of a distributed application development and execution platform is the Microsoft® .NET platform from Microsoft® Corporation of Redmond, Wash. Generally described, the Microsoft® .NET platform is an application programming and execution platform that provides write-once, compile-once, run-anywhere application development. Microsoft® .NET platform applications may be created in any language as long as they are compiled by a compiler that targets the Microsoft®.NET universal runtime ("URT"), also known as the common language runtime engine. Such a compiler compiles .NET applications into intermediate language ("IL"), rather than directly into executable code.

To execute a .NET platform application, the compiled IL is interpreted, or "just-in-time" compiled, by the URT into native machine instructions. The native machine instructions can then be directly executed by the CPU. The Microsoft® .NET platform also includes a base library that comprises a large set of class libraries and services. These libraries and services provide access to the features of the URT, and other high-level services, so that software developers do not have to code the same services repeatedly. Although the present invention may be applicable with regard to a .NET platform implementation, the present invention may also be implemented in alternative platform environments.

While illustrative embodiments have been illustrated and described, it will be appreciated that various changes can be made therein without departing from the spirit and scope of the invention.

The invention claimed is:

1. A computer system for displaying a pane including content associated with media being streamed to a user, the computer system comprising:
   (a) a media component operable to obtain and display streaming media; and
   (b) a content component operable to obtain and display content data associated with said streaming media by:
   (1) obtaining content associated with streaming media by:
      (i) determining if a provider server contains content associated with streaming media;
      (ii) retrieving the content associated with streaming media from the provider server;
      (iii) parsing and validating the retrieved content associated with streaming media to ensure compliance with an input schema, the input schema comprising a job control information element for job control information and an items information element for items information, the job control information element including a job type, the items information element including information for each content item retrieved from the provider server; and
      (iv) storing the parsed and validated content associated with streaming media in a content database;
   (2) generating search files for the content stored in the content database and associated with streaming media by:
      (i) generating content files in accordance with a schema, the schema comprising a job control information element for job control information and an items information element for items information, the job control information element including a job type, the items information element including information for each content item retrieved from the provider server;
      (ii) creating a directory structure to hold the generated content files;
      (iii) adding the generated content files to the directory structure;
      (iv) generating search files in accordance with another schema, the another schema comprising a control information element for job control information and a site information element for sites information; and
      (v) adding the generated search files to the directory structure;
   (3) storing the search files in a search database;
   (4) in response to user input, searching the search database for content associated with the streaming media being displayed; and
   (5) displaying the content resulting from the search while simultaneously displaying the streaming media.

2. The computer system of claim 1, wherein said streaming media is downloaded from the Internet.

3. The computer system of claim 2, wherein said content component includes a client Internet browser.

4. The computer system of claim 2, wherein said content associated with said streaming media includes content provider information.

5. The computer system of claim 2, wherein said content associated with said streaming media includes a link to a content provider resource.

6. The computer system of claim 2, wherein said content associated with said streaming media includes teaser text for related content and a link to the related content.

7. The computer system of claim 2, wherein said content associated with said streaming media includes an image related to said content.

8. The computer system of claim 2, wherein said content associated with said streaming media includes a link to expanded content.

9. The computer system of claim 2, wherein said content associated with said streaming media includes a link to a property resource.

* * * * *